United States Patent [19]

Kamata

[11] Patent Number: 5,422,473
[45] Date of Patent: Jun. 6, 1995

[54] VEHICLE SECURITY SYSTEM AND AUTOMATIC ROADWAY TOLL CHARGING SYSTEM

[75] Inventor: George Kamata, Yokohama, Japan

[73] Assignee: Matsushita Electric Industrial Co., Ltd., Osaka, Japan

[21] Appl. No.: 919,615

[22] Filed: Jul. 24, 1992

Related U.S. Application Data

[62] Division of Ser. No. 722,678, Jun. 24, 1991, abandoned.

[30] Foreign Application Priority Data

Jun. 29, 1990 [JP] Japan .................................. 2-173445

[51] Int. Cl.⁶ .................................................. G07B 15/00
[52] U.S. Cl. ...................................... 235/384; 340/928
[58] Field of Search .................... 235/382, 384, 380; 340/825.54, 928, 933, 937; 364/467

[56] References Cited

U.S. PATENT DOCUMENTS

| | | | |
|---|---|---|---|
| 4,277,837 | 7/1981 | Stuckert | 235/380 X |
| 4,303,904 | 12/1981 | Chasek | 340/825.54 |
| 4,814,595 | 3/1989 | Gilboa | 235/492 |
| 4,877,947 | 10/1989 | Mori | 902/26 X |
| 4,908,500 | 3/1990 | Baumberger | 235/384 |
| 4,963,723 | 10/1990 | Masada | 235/384 |
| 4,977,501 | 12/1990 | Lefevre | 235/384 X |
| 4,982,072 | 1/1991 | Takigami | 235/384 |
| 5,047,614 | 9/1991 | Bianco | 235/385 |
| 5,144,553 | 9/1992 | Hassett | 364/401 |
| 5,204,675 | 4/1993 | Sekine | 340/933 |
| 5,310,999 | 5/1994 | Claus et al. | 235/384 |

FOREIGN PATENT DOCUMENTS

| | | | |
|---|---|---|---|
| 2659573 | 7/1977 | Germany | 902/26 |
| 58-132874 | 8/1983 | Japan | 235/380 |
| 1-082194 | 3/1989 | Japan | 235/380 |
| 1-250187 | 10/1989 | Japan | 235/375 |
| 2-183389 | 7/1990 | Japan | 235/380 |
| 3-046083 | 2/1991 | Japan | 235/380 |

OTHER PUBLICATIONS

K. Kogaku, "Electronic Road Pricing System in Hong Kong," Traffic Engineering, vol. 21, No. 2, pp. 26–29, 1986 (partial translation).
K. Kogaku, "Traffic Engineering," vol. 21, No. 2, pp. 26–29, 1986.

*Primary Examiner*—Donald Hafec
*Assistant Examiner*—Edward H. Sikorski
*Attorney, Agent, or Firm*—Stevens, Davis, Miller & Mosher

[57] ABSTRACT

An IC card adaptor having a wireless communication function and/or an optical communication function enabling a contact-type IC card to be used as an IC card of a non-contact type. The adaptor includes a power supply, a communication processing section, a transmission/reception section, and a device for establishing a contact-point coupling with an IC card developing at least a portion of a function to read data from the card and to write data therein through a contact-type contact point. An automatic roadway toll charging system employs such an IC card and IC card adaptor, as well as a card reader unit, a license plate identification unit, a comparison/collation unit, and a fee calculation unit to verify proper vehicle passage onto a roadway and calculate a required fee. A vehicle security system is disclosed which verifies proper vehicle passage into a security area.

4 Claims, 3 Drawing Sheets

F I G. 1
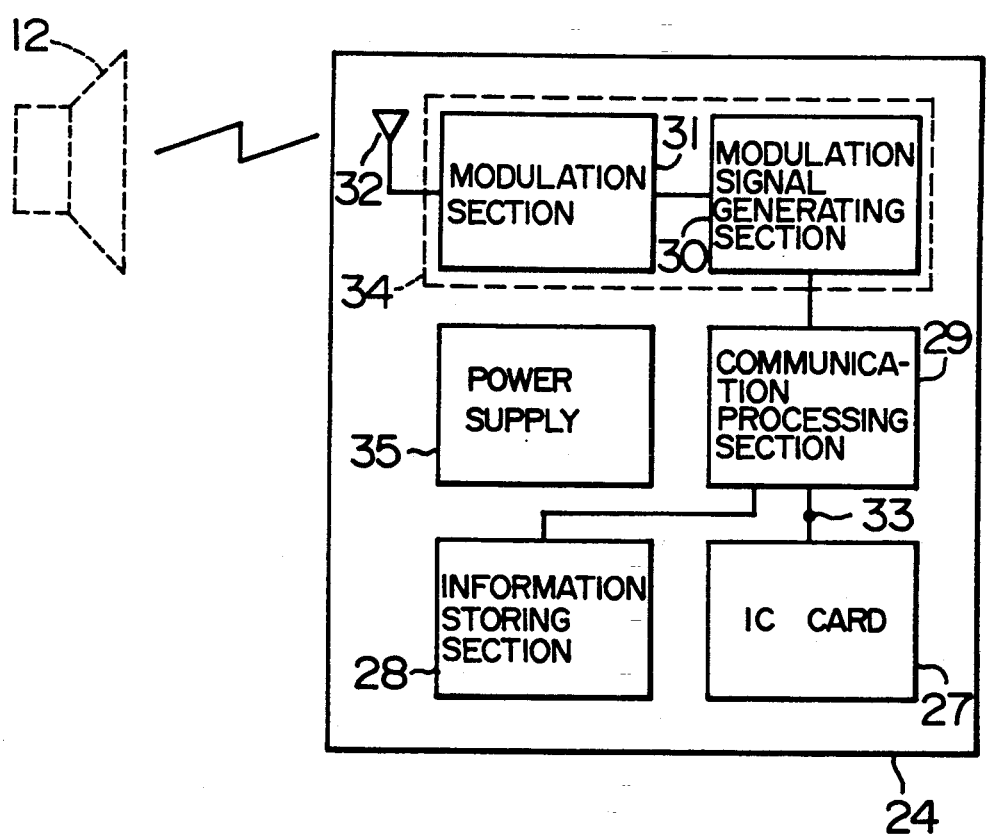

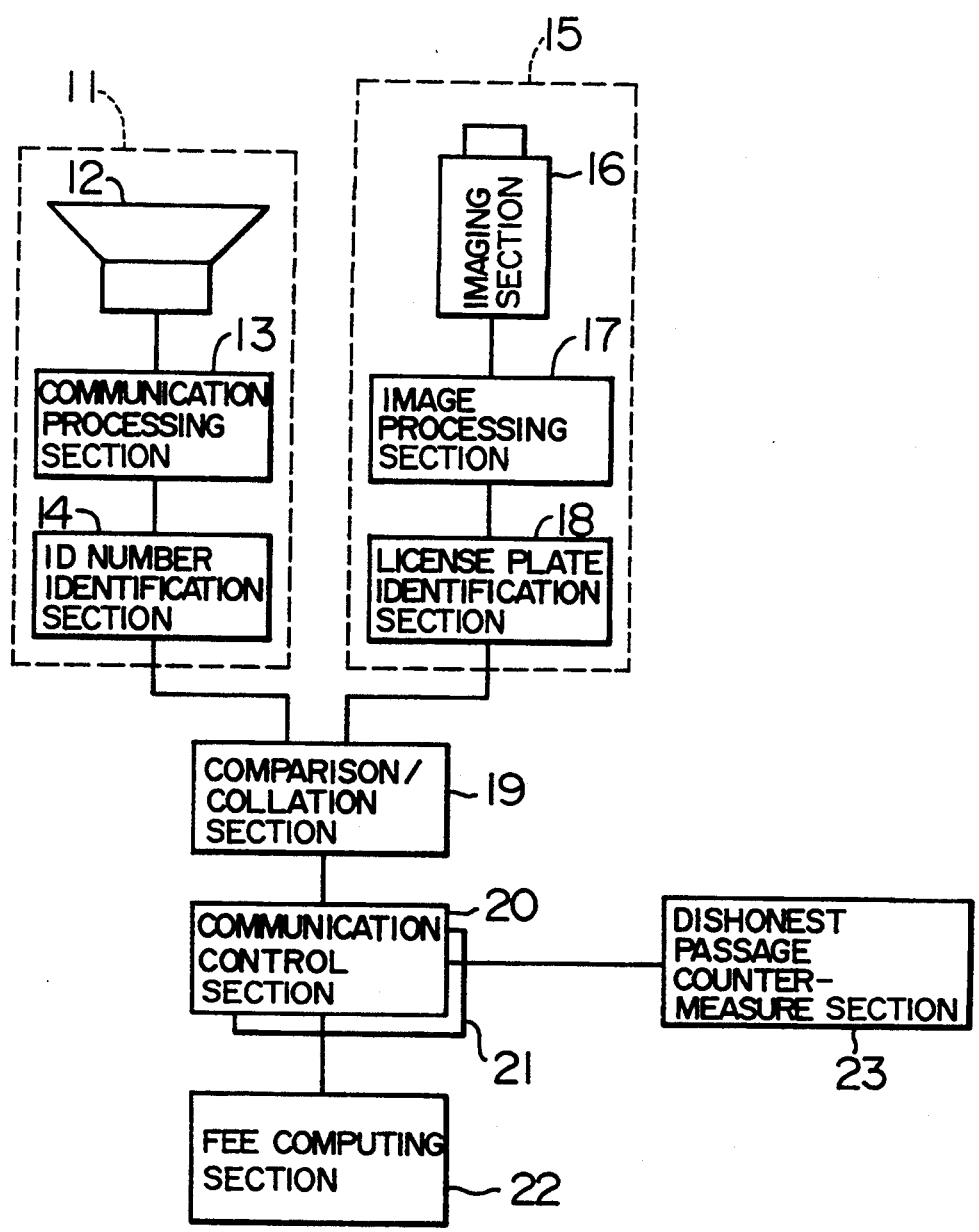
F I G. 2

F I G. 3
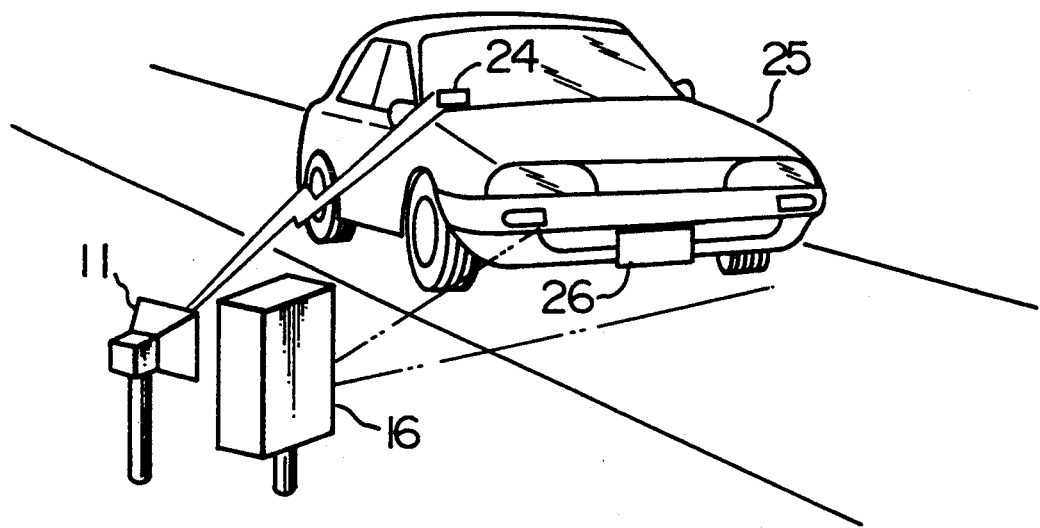

VEHICLE SECURITY SYSTEM AND AUTOMATIC ROADWAY TOLL CHARGING SYSTEM

This application is a division of application Ser. No. 07/722,678, filed Jun. 24, 1991, (abandoned).

BACKGROUND OF THE INVENTION

The present invention relates to an integrated circuit (IC) card adapter which is employed to implement an automatic charging system for charging fees for use on a toll road, an expressway, or the like and to achieve discrimination of a vehicle to which permission for entry into a security zone is granted.

Heretofore, in an automatic charging system utilized to charge fees in a toll road facility or the like, a wireless IC card developing a single dedicated function has been regarded as an identification card of each vehicle, for example, as described in pages 26 to 29 of "Traffic Engineering", Vol. 21, No. 2 issued from the Institute of Traffic Engineering.

However, the wireless IC card or plate has relatively a large size and a heavy weight i.e. the user of the wireless IC card feels inconvenience when carrying the IC plate in a purse or the like. On the other hand, an IC card has already been put to actual use in some financial facilities and the like. In the processing of the IC card, information read and write operations are ordinarily conducted via a contact point thereof. Since the IC card has a smaller size and a reduced weight, transportability thereof is suitable for the user. However, it has been difficult for the IC card to achieve the information read and write operations of a non-contact type, for example, through a radio communication, an optical communication, and the like.

On the other hand, at locations such as a toll gate of an expressway, it is preferable, in consideration of mitigation of the traffic congestion due to the charging operation, to adopt a non-stop automatic charging system using a wireless IC card. If the IC cards used in the financial facilities already put to practice can be processed in the charging system above, the charging operation can be accomplished together with confirmation of the balance of the user's account in a bank; moreover, the traffic data associated with the charging operation can be preserved at the same time, thereby implementing an automatic charging system having a high reliability.

SUMMARY OF THE INVENTION

It is therefore an object of the present invention to provide an IC card adapter capable of achieving a non-contact automatic charging operation by taking advantage of a contact-type IC card.

According to one aspect of the present invention, there is provided a contact-type IC card adapter in which the contact-type IC card can be detachably installed and which is constituted with such sections as a communication processing section, a transmission/-reception section, and a power supply section so as to develop a function of a wireless communication and/or an optical communication, thereby implementing a non-contact communication function for the contact-type IC card.

With the constitution above, the IC card adapter according to the present invention advantageously achieves the following operations. That is, information loaded in the contact-type IC card is transmitted to the communication processing section of the IC card adapter via a contact point disposed between the contact-type IC card and the IC card adapter. The information is then stored in the communication processing section or in an information storing section when necessary. Thereafter, the information is processed through operation of the power supply section and the transmission/reception section to be amplified and to be transformed into a radio wave for a radio communication or a light beam for optical communication, thereby accomplishing an information exchange of a non-contact type with an external device or system.

BRIEF DESCRIPTION OF THE DRAWINGS

These and other objects and advantages of the present invention will become apparent by reference to the following description and accompanying drawings wherein:

FIG. 1 is a schematic block diagram showing an IC card adapter in an embodiment according to the present invention;

FIG. 2 is a block diagram illustratively showing a vehicle identification apparatus to which the embodiment of FIG. 1 is applied; and FIG. 3 is a perspective view showing an appearance of the embodiment installed along a road.

DESCRIPTION OF THE PREFERRED EMBODIMENT

FIG. 2 shows the constitution of an automobile identification apparatus employing an IC card adapter in an embodiment according to the present invention. The configuration of FIG. 2 includes an IC card reader section 11 comprising an antenna section 12 to be installed along a street, a communication processing section 13, and an ID number identification section 14, which are connected to the related sections as shown. A reference numeral 15 denotes a licence or number plate reader section 15 including an imaging section 16, an image processing section 17, and a license plate identification section 18 respectively connected to the associated sections as shown. The IC card reader section 11 and the license plate reader section 15 are each linked or connected with a comparison/collation section 19, which are further connected to communication control sections 20 and 21. The communication control section 20 is linked with a fee computing section 22, whereas the communication control section 21 is connected to a dishonest or inappropriate passage countermeasuring section 23.

FIG. 3 shows a perspective image of a configuration example of the embodiment of FIG. 2 installed along a read. In this diagram, an IC card adapter 24 disposed in a vehicle 25 accomplishes an information exchange with the antenna section 12 of the IC card reader section 11 through a radio wave or the like, whereas the imaging section 16 generates an image of a license plate 26.

Next, a description will be given of the operation achieved by the embodiment. The IC card reader section 11 of this embodiment achieves a communication such as a radio communication or an optical communication between the antenna section 12 thereof and the IC card adapter 24 installed in the vehicle 25 so as to receive information of an ID number thereof. The ID number information is passed from the communication processing section 13 to the ID number identification section 14, which in turn identifies the ID number information and license plate information at least included in the ID number information such as an automobile type code and a four-digit sequence number, thereby transmitting the license plate information to the comparison/collation section 19.

In the license plate reader section 15, the imaging section 16 generates an image of the license plate 26 of the running vehicle 25 so as to pass the image via the image processing section 17 to the license plate identification section 18, which then identifies such items of the license plate information as an automobile type-code and a four-digit sequential number, thereby transmitting the information to the comparison/collation section 19. In the comparison/collation section 19, the license plate information received from the ID number identification section 14 is compared with that supplied from the license plate identification section 18. If a matching condition results, a positive judgement is assumed such that vehicle passage information is sent via the communication control section 20 to the fee computing section 22, which in turn conducts an appropriate fee computation depending on the automobile type and the other related information items. Moreover, necessary information items such as an account number of a bank, an account balance, etc. of the IC card 27 are memorized. Furthermore, if an unmatching condition results from the information comparison, the comparison/collation section 19 assumes a negative judgement to send information of the unmatching condition via the communication control section 21 to the dishonest or inappropriate passage countermeasure section 23, which then carries out necessary operations, for example, to close a gate or to take a photograph of the vehicle associated with the incorrect passage judgement (components related to these operations are not shown).

As above, according to the embodiment, the correct license plate information which is attained from the IC card reader section 11 and which is information of an IC card to be inherently coupled with the IC card adapter 24 and the vehicle license plate information which is obtained from the license plate reader section 15 and which is associated with a vehicle to which the ID plate is actually attached can be identified in a realtime fashion. The license plate information is then subjected to a collation in the comparison/collation section 19, which leads to an advantageous effect that a wrong use of the ID plate is prevented and a failure of the ID plate is detected in a realtime manner.

When a sequential ID number e.g. a ten-digit number is written in the IC card adapter 24, the license plate information may also be loaded therein as a portion of the ID number. Moreover, the license plate information possibly includes information items such as an official approval code (of the District Land Transport Bureau of Japan), an automobile type code, a utilization code, and a four-digit sequential number. Each of these items may be directly employed as the ID number.

FIG. 1 shows the configuration of the IC card adapter 24, which comprises a transmission/reception section 34 including a modulation signal generating section 30 and a modulation section 31, a plate antenna section 32, a communication processing section 29, an information storing section 28, and a power supply 35. In operation, an IC card 27 is installed in the IC card adapter 24 to be resultantly connected to the communication processing section 29.

On receiving a request signal from the antenna 12 installed on the street side, the IC card adapter 24 generates information through operations of the plate antenna section 32, the modulation section 31, and the modulation signal generating section 30, thereby preparing for a transmission of the information from the communication processing section 29 to the antenna 12. Particularly, the communication processing section 29 issues a request via the contact point 33 to the IC card 27 for such information items as an account number and a balance of the account necessary for the payment of the fee. In response thereto, the IC card 27 confirms a procedure related to data security for the transmission of the requested information and then delivers the necessary information to the communication processing section 29. In this connection, the information storing or accumulating section 28 is used to keep therein the related information, for example, a string of numeric characters and license plate information of an automobile.

As described above, according to the embodiment, the information transmission and reception can be accomplished through a communication of a non-contact type between the IC card 27 of an ordinary contact type and the communication processing section 29 and the transmission/reception section 34 via the contact point 33. This leads to a remarkable effect that an IC card 27 of a contact type used in ordinary banking facilities virtually functions as an IC card of a non-contact type.

In short, there is attained an advantageous effect. That is, in an ordinary case, the contact-type IC card is independently used to process banking transactions of financial facilities. On the other hand, in a case where the user of the contact-type IC card is driving a vehicle, if the card is installed in the IC card adapter 24, the contact-type IC card can develop a function of a wireless IC card for a non-stop automatic charging operation.

As can be seen from the description of the embodiment above, in accordance with the present invention, when a contact-type IC card is attached onto an IC card adapter having a wireless communication function and-/or an optical communication function, a function of an IC card of a non-contact type can be advantageously implemented for the contact-type IC card. Naturally, the high security function of the contact-type IC card is preserved.

Furthermore, unlike an ordinary IC card of a non-contact type, the IC card adapter including a power supply, a communication processing section and a transmission/reception section is configured to be detachable from the card. In consequence, a satisfactory performance can be developed with respect to the transmission power and hence such restrictions as a limitation of transmission distance imposed thereon can be removed. Furthermore, the size and weight of the body of the IC card 27 are kept unchanged and consequently the portability thereof is preserved, namely, the IC card 27 can be placed in a purse of the user to be carried about.

In addition, with the provision of the information storing section 28 or unit in the IC card adapter, necessary ID information can be set thereto in an independent manner with respect to the IC card 27, which leads to a favorable effect of a high flexibility in practical usage.

Moreover, when the vehicle license plate information is stored in the information storing section, the stored information may be used to improve the security efficiency of the IC card; furthermore, the information may be effectively utilized in situations such as, for example, if the IC card is stolen. Furthermore, if necessary, the IC card can be loaded with; in addition to information of a fee charging office, a charged amount, and information of date (including the year, month, day, and time); also, information of the vehicle number assigned to the pertinent vehicle can be stored therein. This leads to a result that it is possible to control the history of the charging operation for the respective vehicles. In the above description the word "section" can be clearly replaced by an alternative word "unit" to achieve like merits or advantages of the present invention.

As many apparently widely different embodiments of the present invention can be made without departing from the spirit and scope thereof, it is to be understood that the invention is not limited to the specific embodiment thereof except as defined in the appended claims.

I claim:

1. An automatic roadway toll charging system for vehicles, comprising:
   (a) an IC card including a memory storing at least information data indicating a license plate number of a vehicle of a user of said IC card;
   (b) an IC card adapter for being mounted on said vehicle, said adapter including means for reading out said information data from said memory on said IC card; means for converting said information data read out from memory to a radio wave signal and for transmitting said radio wave signal; and receiver means for receiving and converting an input radio wave signal and for providing said input radio wave signal to said memory for storage;
   (c) an IC card reader means, mounted on a roadway, said card reader means including means for receiving said radio wave signal transmitted by said adapter, reading said license plate number contained in said radio wave signal and providing an output signal representing said license plate number;
   (d) a license plate identification means, mounted on the roadway, for reading a license plate of the vehicle to ascertain its license plate number and providing an output signal representing said license plate number;
   (e) a comparison/collation means for collating said output signal from said reader means, representing said license plate number, and said output signal from said license plate identification means, representing said license plate number, to provide a collation output signal indicating a coincidence collation result or a non-coincidence collation result;
   (f) a communication control means for receiving said collation output signal and, in response to said coincidence collation result, for calculating a required fee and transmitting a signal indicating said fee to said receiver means of said adapter for provision to and storage in said memory of said IC card, and, in response to said non-coincidence collation result, for outputting a signal indicating improper vehicle passage; and
   (g) an information storage means for storing information therein wherein the information in said information storage means is at least one of information representing said license plate number of said vehicle and identification information of said user.

2. A vehicle security system, comprising:
   (a) an IC card including a memory storing at least information data indicating a license plate number of a vehicle of a user of said IC card;
   (b) an IC card adapter for being mounted on said vehicle, said adapter including means for reading out said information data from said..memory on said IC card; means for converting said information data read out from memory to a radio wave signal and for transmitting said radio wave signal; and receiver means for receiving and converting an input radio wave signal and for providing said input radio wave signal to said memory for storage;
   (c) an IC card reader means mounted on a roadway, said card reader means including means for receiving said radio wave signal transmitted by said adapter, reading said license plate number contained in said radio wave signal and providing an output signal representing said license plate number;
   (d) a license plate identification means, mounted on the roadway, for reading a license plate of the vehicle to ascertain its license plate number and providing an output signal representing said license plate number.;
   (e) a comparison/collation means for collating said output signal from said reader means., representing said license plate number, and said output signal, from said license plate identification means, representing said license plate number, to provide a collation output signal indicating a coincidence collation result or a non-coincidence collation result.;
   (f) a communication control means for receiving said collation output signal and, in response to said coincidence collation result, outputting a signal indicating proper vehicle passage and, in response to said non-coincidence collation result, for outputting a signal indicating improper vehicle passage; and
   (g) an information storage means for storing information therein wherein the information in said information storage means is at least one of information representing said license plate number of said vehicle and identification information of said user.

3. An automatic roadway toll charging system for vehicles, comprising:
   (a) an IC card including a memory storing at least information data indicating a license plate number of a vehicle of a user of said IC card;
   (b) an IC card reader means mounted on a roadway;
   (c) an IC card adapter for being mounted on said vehicle, said adapter including:
      (i) transmission/reception means for performing non-contact information transmission/reception via one of a radio wave signal or an optical signal with respect to said IC card reader means;
      (ii) communication processing means for receiving information from said transmission/reception unit input thereto from the IC card reader means and for providing said information data received from said IC card to said transmission/reception unit;
      (iii) coupling means for achieving a contact-point coupling between said communication processing means and the IC card, said coupling means having means for enabling operations by said communication processing means of data writing in and data reading from the IC card; and (iv) power supply means for supplying power to said transmission reception means and said communication processing means;

(d) said IC card reader means including means for receiving said radio wave signal or optical signal transmitted by said adapter, reading said license plate number contained in said radio wave signal or optical signal and providing an output signal representing said license plate number;

(e) a license plate identification means, mounted on the roadway, for reading a license plate of the vehicle to ascertain its license plate number and providing an output signal representing said license plate number;

(f) a comparison/collation means for collating said output signal from said reader means, representing said license plate number, and said output signal from said license plate identification means, representing said license plate number, to provide a collation output signal indicating a coincidence collation result or a non-coincidence collation result;

(g) a communication control means for receiving said collation output signal and, in response to said coincidence collation result, for calculating a required fee and transmitting a signal indicating said fee to said adapter for provision to and storage in said memory of said IC card, and, in response to said non-coincidence collation result, for outputting a signal indicating improper vehicle passage; and (h) an information storage means for storing information therein wherein the information in said information storage means is at least one of information representing said license plate number of said vehicle and identification information of said user.

4. A vehicle security system, comprising:

(a) an IC card including a memory storing at least information data indicating a license plate number;

(b) an IC card reader means mounted on a roadway;

(c) an IC card adapter for being mounted on said vehicle, said adapter including:

(i) transmission/reception means for performing non-contact information transmission/reception via one of a radio wave signal or an optical signal with respect to said IC card reader means;

(ii) communication processing means for receiving information from said transmission/reception unit input thereto from the IC card reader means and for providing said information data received from said IC card to said transmission/reception unit;

(iii) coupling means for achieving a contact-point coupling between said communication processing means and the IC card, said coupling means having means for enabling operations by said communication processing means of data writing in and data reading from the IC card; and (iv) power supply means for supplying power to said transmission reception means and said communication processing means;

(d) said IC card reader means including means for receiving said radio wave signal or optical signal transmitted by said adapter, reading said license plate number contained in said radio wave signal or optical signal and providing an output signal representing said license plate number;

(e) a license plate identification means, mounted on the roadway, for reading a license plate of the vehicle to ascertain its license plate number and providing an output signal representing said license plate number;

(f) a comparison/collation means for collating said output signal from said reader means, representing said license plate number, and said output signal, from said license plate identification means, representing said license plate number to provide a collation output signal indicating a coincidence collation output signal indicating a coincidence collation result or a non-coincidence collation result;

(g) a communication control means for receiving said collation output signal and, in response to said coincidence collation result, outputting a signal indicating proper vehicle passage and, in response to said non-coincidence collation result, for outputting a signal indicating improper vehicle passage; and (h) information storage means for storing information therein wherein the information in said information storage means is at least one of information representing said license plate number of said vehicle and identification information of said user.

* * * * *